United States Patent
Chen

(10) Patent No.: US 10,540,089 B2
(45) Date of Patent: Jan. 21, 2020

(54) METHOD AND MOBILE DEVICE FOR ACTIVATING VOICE INTERCOM FUNCTION OF INSTANT MESSAGING APPLICATION SOFTWARE

(71) Applicant: Tencent Technology (Shenzhen) Company Limited, Shenzhen (CN)

(72) Inventor: Zhiqiang Chen, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 222 days.

(21) Appl. No.: 14/186,603

(22) Filed: Feb. 21, 2014

(65) Prior Publication Data

US 2014/0337739 A1 Nov. 13, 2014

Related U.S. Application Data

(63) Continuation of application No. PCT/CN2013/087925, filed on Nov. 27, 2013.

(30) Foreign Application Priority Data

May 13, 2013 (CN) .......................... 2013 1 01747915

(51) Int. Cl.
    G06F 3/16 (2006.01)
    G06F 3/0488 (2013.01)
    H04M 1/725 (2006.01)
(52) U.S. Cl.
    CPC ................. *G06F 3/04886* (2013.01)
(58) Field of Classification Search
    CPC .............. G06F 3/0488; G06F 3/04886; H04M 1/72547; H04M 2250/22; H04M 1/72552
    See application file for complete search history.

(56) References Cited

U.S. PATENT DOCUMENTS

2004/0202117 A1* 10/2004 Wilson ................ H04L 12/1827
                                                   370/310
2004/0225502 A1* 11/2004 Bear ..................... G06F 3/0219
                                                   704/270

(Continued)

FOREIGN PATENT DOCUMENTS

CN          102084325 A       6/2011
CN          102750365 A      10/2012

(Continued)

OTHER PUBLICATIONS

Amy-Mae Elliot, How to send a voice message via Facebook, Feb. 21, 2013, 6 pages.*

(Continued)

*Primary Examiner* — Ryan F Pitaro
*Assistant Examiner* — Parmanand D Patel
(74) *Attorney, Agent, or Firm* — Morgan, Lewis & Bockius LLP

(57) ABSTRACT

A method and a mobile device are described for activating voice intercom function of instant messaging application software. In the method, a touch screen detects a touch action. The mobile device determines whether the touch point of the touch action is located in a preset location area and whether the touch action is a preset touch action. The mobile device activates voice intercom function of instant messaging application software if both determination results are affirmative. The method and mobile device are configured to conveniently activate voice intercom function of instant messaging application software.

14 Claims, 4 Drawing Sheets

(56) References Cited

U.S. PATENT DOCUMENTS

| | | | | |
|---|---|---|---|---|
| 2007/0280432 | A1* | 12/2007 | Richardson | G10L 25/78 379/67.1 |
| 2009/0290854 | A1* | 11/2009 | Smith | H04N 9/8211 386/239 |
| 2011/0157046 | A1* | 6/2011 | Lee | G04G 21/08 345/173 |
| 2012/0071137 | A1* | 3/2012 | Bisrat | H04M 1/642 455/413 |
| 2012/0072508 | A1* | 3/2012 | Grigoriev | G06Q 20/085 709/206 |
| 2012/0162093 | A1* | 6/2012 | Buxton | G06F 3/0482 345/173 |
| 2013/0121481 | A1* | 5/2013 | Mikan | H04L 51/10 379/88.14 |
| 2014/0082694 | A1* | 3/2014 | Sanghavi | G06F 21/31 726/3 |

FOREIGN PATENT DOCUMENTS

| | | |
|---|---|---|
| CN | 102761658 A | 10/2012 |
| CN | 102841730 A | 12/2012 |

OTHER PUBLICATIONS

First Office Action issued in Chinese Patent Application No. 2013/10174791.5, dated May 13, 2013 (7 pages).

Office Action for Chinese Application No. 2013/10174791.5 dated Oct. 28, 2015 (5 pages).

International Search Report and Written Opinion for PCT Application No. PCT/CN2013/087925 dated Feb. 27, 2014 (12 pages).

Tencent Technology, IPRP, PCT/CN2013/087925, dated Nov. 17, 2015, 6 pgs.

* cited by examiner

METHOD AND MOBILE DEVICE FOR ACTIVATING VOICE INTERCOM FUNCTION OF INSTANT MESSAGING APPLICATION SOFTWARE

CROSS-REFERENCE TO RELATED APPLICATIONS

This application is a continuation of International Application No. PCT/CN2013/087925, filed on Nov. 27, 2013, which claims priority to 201310174791.5, filed on May 13, 2013, both of which are hereby incorporated herein by reference in their entireties.

FIELD

The present disclosure relates generally to the field of communication technology and, more particularly, to a method and mobile device for activating voice intercom function of instant messaging application software.

BACKGROUND

Along with the development of instant messaging technology, the use of instant messaging application software and mobile instant messaging application software is increasingly extensive. Presently, instant messaging application software is capable of supporting voice intercom function, and prior art method for activating the voice intercom function of instant messaging application software is as follows: user clicks the voice intercom button or the voice intercom function icon; mobile device initiates voice intercom function after detecting the user's click. Thereafter, the user achieves voice intercom by pressing and holding the voice intercom button or the voice intercom function icon, and cancels it by having his/her fingertip sliding upwards.

As the voice intercom button or the voice intercom function icon is located at a specific location on the touch screen, usually at the bottom of the touch screen, the user must press the touch screen at that specific location to be able to activate voice intercom function, and this causes inconvenience for the operation of activating the voice intercom function of instant messaging application software.

SUMMARY

The present disclosure provides a method for activating voice intercom function of instant messaging application software installed in a mobile device. The method is configured to conveniently activate voice intercom function of the instant messaging application software.

The present disclosure further provides a mobile device for activating voice intercom function of instant messaging application software. The mobile device is configured to conveniently activate voice intercom function of instant messaging application software.

In an aspect, a method is disclosed for activating voice intercom function of instant messaging application software. In the method, a touch screen detects a touch action. The mobile device determines whether the touch point of the touch action is located in a preset location area and whether the touch action is a preset touch action. The mobile device activates voice intercom function of instant messaging application software if both determination results are affirmative.

In an aspect, a mobile device is disclosed for activating voice intercom function of instant messaging application software. The mobile device includes a touch screen that detects a touch action. The mobile device also includes a processor and a non-transitory storage medium. The non-transitory storage medium is configured to store a determination module. The determination module is configured to determine whether the touch point of the touch action is located in a preset location area and whether the touch action is a preset touch action; activate voice intercom function of instant messaging application software if both determination results are affirmative.

It can therefore be seen that the method and mobile device for activating voice intercom function of instant messaging application software provided by the present disclosure are configured to conveniently activate voice intercom function of instant messaging application software when it is detected that a touch point is located in a preset location area and that the touch action is a preset touch action, thereby avoiding limitation of user's action and achieving convenient activation of voice intercom function.

DETAILED DESCRIPTION OF THE DRAWINGS

For a better understanding of the aim, scheme and advantages of the present disclosure, example embodiments thereof are described in detail in connection with the accompanying drawings as follows. The different embodiments may be combined at least partially.

Figure 1A:
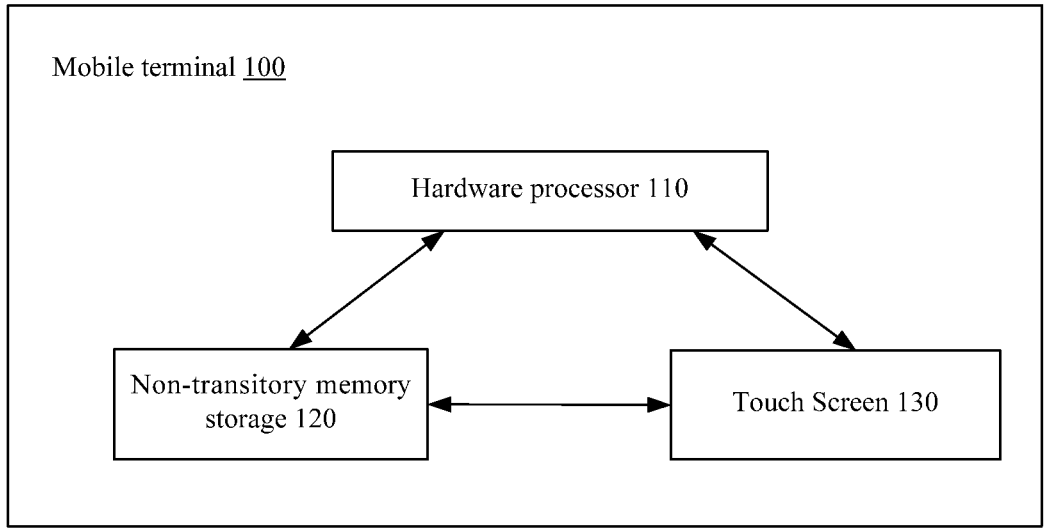
FIG. 1(a) is an example embodiment of a mobile device of the present disclosure.

The present disclosure provides a method for activating voice intercom function of instant messaging application software in a mobile device. The mobile device may be a smart phone, a media player, a tablet, or any computing device having a processor and a non-transitory memory storage. FIG. 1(a) shows an example embodiment of a mobile device 100 including a processor 110, a non-transitory memory storage 120, and a touch screen 130.

Figure 1B:
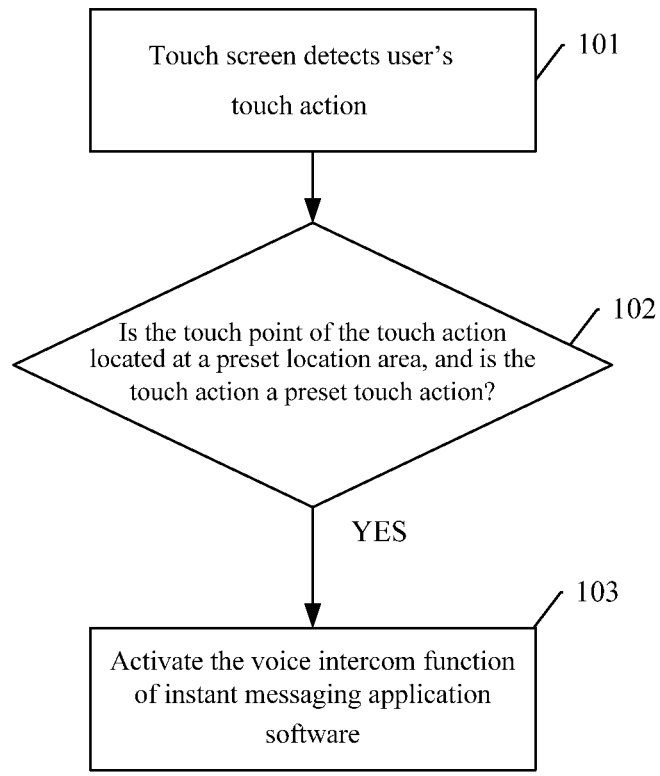
FIG. 1(b) is a process flow diagram of an example method for activating voice intercom function of instant messaging application software provided by the present disclosure.

As shown in FIG. 1(b), a process flow diagram thereof, the method includes:

Step 101: touch screen detecting user's touch action;

Step 102: determining whether the touch point of the touch action is located in a preset location area and whether the touch action is a preset touch action; performing Step 103 if both determination results are affirmative; the process ends if any one of the determination results is negative.

Step 103: activating voice intercom function of instant messaging application software.

In Step 102, the preset location area is: a voice intercom area on the touch screen.

In Step 102, the preset touch action is: clicking consecutively twice and continuing to press after the second click, or pressing continuously with the duration exceeding a preset threshold.

After Step 103, the method may further include:

beginning to record, determining whether the amount of audio data generated by recording is greater than a preset threshold when the touch screen detects that pressing of the touch point has disappeared, and transmitting the audio data if the amount of audio data generated by recording is greater than the preset threshold.

Or, after Step 103, the method may further include:

beginning to record, and deleting the audio data generated by recording when the touch screen detects that the displacement of the touch point exceeds a preset threshold.

Or, after Step 103, the method may further include:

reading the audio data if the unread audio data used for voice intercom function is locally stored.

The method is further described below in connection with an example embodiment.

Figure 2A:
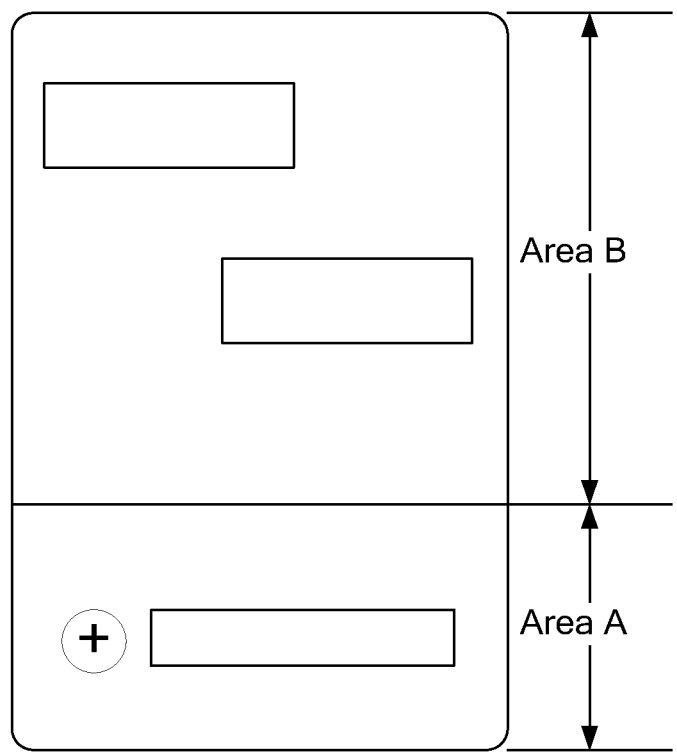
FIG. 2(a) is a schematic view of a touch screen in an application scenario of an example embodiment of the present disclosure.

Once the user selects an interlocutor, the system divides the touch screen into two areas, i.e. text dialogue area and voice intercom area. As shown in FIG. 2(a), which is a schematic view of a touch screen in an application scenario of an example embodiment of the present disclosure, the touch screen is divided into a voice intercom area (hereinafter referred to as "Area B") located at the top and a text dialogue area (hereinafter referred to as "Area A") located at the bottom. The user may activate voice intercom function at any location in Area B.

Figure 2B:
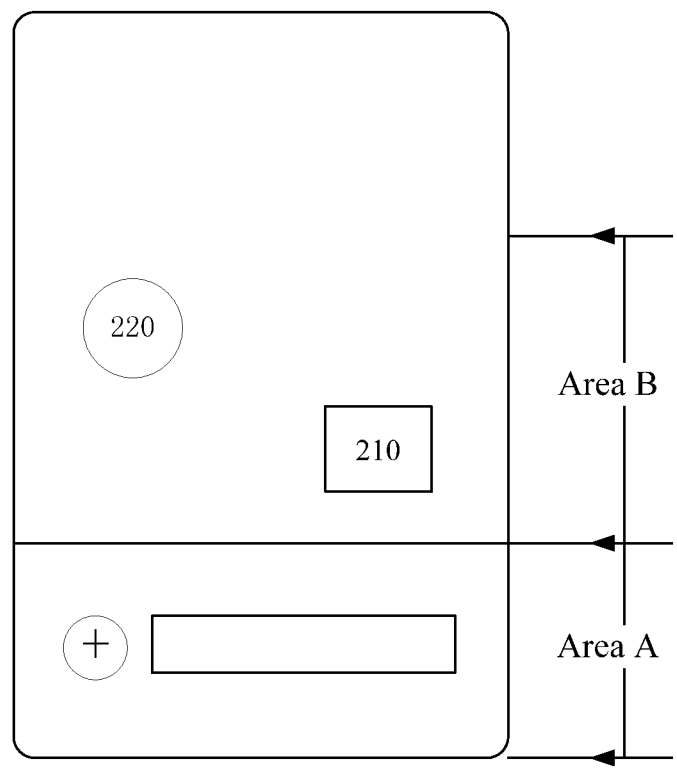
FIG. 2(b) is a schematic view of a touch screen in an application scenario of a second example embodiment of the present disclosure.

Area B may be preset by the mobile system initially and may also be changed by users of the mobile device. Area B may include the upper half of the touch screen as shown in FIG. 2(a). Alternatively, Area B may only include the central part of the touch screen as shown in FIG. 2(b). Area B is configured such that the user can conveniently tap or touch the desired functional area 210 or 220 in Area B with the thumb or other preferred finger. The functional area 210 or 220 may have different shapes and may be customized by the user of the mobile device. The functional area 210 or 220 may be designated for recording voice or deleting the recorded voice as desired by the user. The whole area B may be transparent, or half transparent. The functional area 210 or 220 may be transparent, or be identified with a particular color, or be identified with a picture or an icon selected by the user.

Figure 2C:
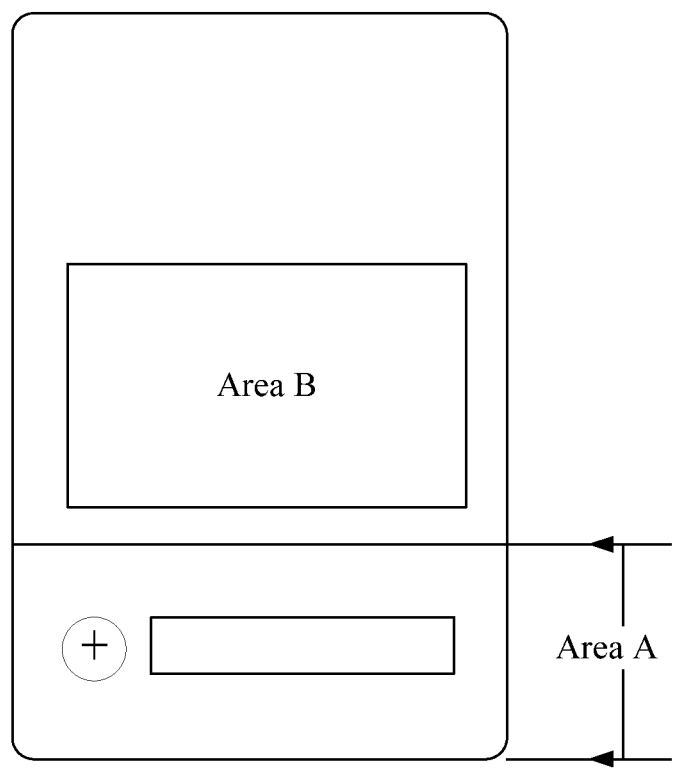
FIG. 2(c) is a schematic view of a touch screen in an application scenario of a third example embodiment of the present disclosure.

As shown in FIG. 2(c), area B may only include a central portion of the touch screen. The shape of area B may be any shape including rectangle, circle, or other shapes the user prefers.

Figure 3:
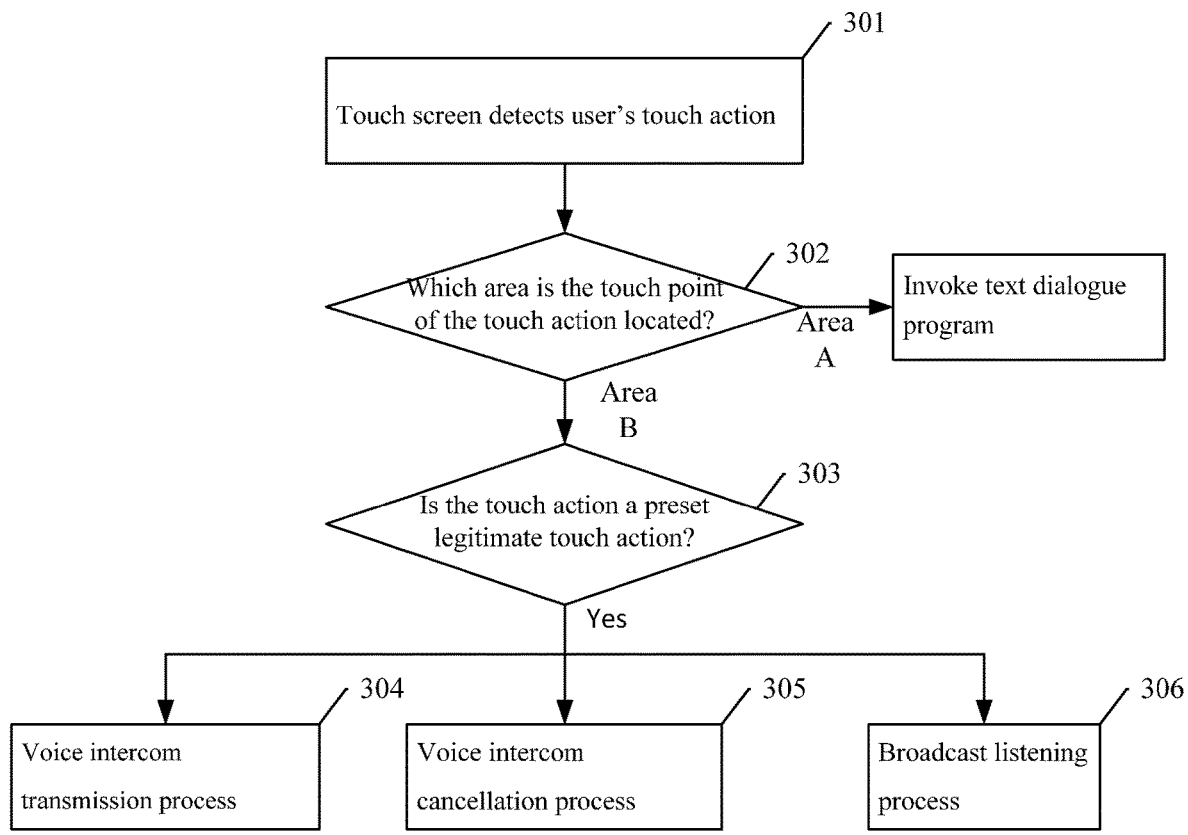
FIG. 3 is a process flow diagram of an example embodiment of the present disclosure.

As shown in FIG. 3, which is an example process flow diagram an example embodiment, the method includes:

Step 301: touch screen detecting user's touch action.

Step 302: determining which area the touch point of the touch action is located; invoking text dialogue program if the touch point is located in Area A, and performing Step 303 if the touch point is located in Area B.

Step 303: determining whether the touch action is a preset legitimate touch action (whether the touch action satisfies the conditions for invoking voice intercom program), and initiating voice intercom function if affirmative. Ends the process if the touch action is not the preset legitimate touch action.

In this embodiment, the preset legitimate touch action is: clicking consecutively twice and continuing to press after the second click, or pressing continuously with the duration exceeding a preset threshold (e.g. 1 second).

Of course, other legitimate touch actions may be defined for initiating voice intercom function.

After initiating voice intercom function, the system may have the following three processing modes corresponding to the user's different actions and the current scenarios:

Processing Mode 1:

Step 304: voice intercom transmission process.

The user begins to speak and the system begins to record. When the user's finger unpresses, the system senses the departure of the user's finger from the touch screen through the sense of touch of the touch screen and determines whether to transmit the recorded audio data (if the user presses the voice intercom button without speaking, or if the background noise is soft and results in extremely low decibel levels, an invalid record content or meaningless content will be formed). If the amount of audio data is greater than a preset threshold, it is deemed to have met the conditions for transmission and transmission is performed. Otherwise, the audio data is deemed to be invalid file and discarded.

Processing Mode 2:

Step 305: voice intercom cancellation process.

The user begins to speak and the system begins to record. When the user's finger slides a distance on the screen, the system detects the action and compares the distance between the starting point and ending point of the user's finger with a length preset by the system, and if it is detected that the distance is greater than the preset length, then it is determined that the user voluntarily abandons the record, and the system performs discard process to delete the audio data.

Processing Mode 3:

Step 306: broadcast listening process.

Reads the audio data if the unread audio data used for voice intercom function is locally stored, to broadcast the other party's voice message for the user. After broadcasting, voice intercom program may continue to be invoked and executed according to the user's touch action.

For processing mode 3, the method may include the following steps before Step 301:

Receiving information from the other party, storing the information and analyzing the type of the information, and the visual display mode on the screen may follow the existing mode. When the system determines that the information is audio data for voice intercom function, the performance of Step 301 is begun.

Figure 4:
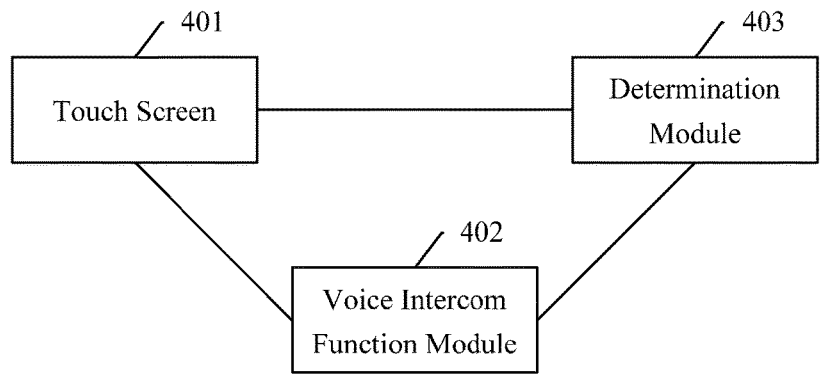
FIG. 4 is a schematic block diagram of a mobile device for activating voice intercom function of instant messaging application software provided by the present disclosure.

The present disclosure also provides a terminal for activating voice intercom function of instant messaging application software. As shown in FIG. 4, which is a schematic block diagram of the mobile device, the mobile device includes a touch screen 401 and a determination module 402. The touch screen 401 is configured to detect a touch action. The determination module 402 is configured to determine whether the touch point of the touch action is located in a preset location area and whether the touch action is a preset touch action; activate voice intercom function of instant messaging application software if both determination results are affirmative.

In the above mobile device, the preset location area may be: a voice intercom area on the touch screen. The touch action may be a touch action by a finger, a touching device, or other objects known in the art.

The preset touch action may be: clicking consecutively twice and continuing to press after the second click, or pressing continuously with the duration exceeding a preset threshold.

The above mobile device may further include:

a voice intercom function module 403 for beginning to record after being activated by the determination module 402, determining whether the amount of audio data generated by recording is greater than a preset threshold when the touch screen detects that pressing of the touch point has disappeared, and transmitting the audio data if the amount of audio data generated by recording is greater than the preset threshold.

Or, a voice intercom function module 403 for beginning to record after being activated by the determination module 402, and deleting the audio data generated by recording when the touch screen detects that the displacement of the touch point exceeds a preset threshold.

Or, a voice intercom function module 403 for reading the audio data, after being activated by the determination module 402, if the unread audio data used for voice intercom function is stored in the mobile device.

It can be seen from the foregoing that the method and mobile device for voice intercom function of instant messaging application software provided by the present disclosure activates voice intercom function of instant messaging application software after detecting that the user's touch point is located in a preset location area and the touch action is a preset touch action, and as the location area occupies a good part of the touch screen, limitation of user's action is avoided and convenient activation of voice intercom function is achieved. In addition, when the user needs to cancel transmission of record, the user is only required to slide his/her finger a distance on the touch screen without having to move his/her hand away to confirm, and this avoids hefty action when canceling voice transmission.

Disclosed above are only example embodiments of the present disclosure and these example embodiments are not intended to be limiting the scope of the present disclosure, hence any variations, modifications or replacements made without departing from the spirit of the present disclosure shall fall within the scope of the present disclosure.

I claim:

1. A method for activating voice intercom function of instant messaging application software, comprising:
   at a mobile device having one or more processors, a touch screen and memory storing one or more programs to be executed by the one or more processors:
      displaying, by the mobile device, a user interface of the instant messaging application software on the touch screen, the user interface including:
         (1) a voice intercom area including:
            (a) a conversation sub-area including one or more message indicators representing messages exchanged between users using the instant messaging application software; and
            (b) an audio recording sub-area within the voice intercom area that is not occupied by any of the message indicators and visually distinct from the message indicators, wherein the audio recording sub-area acts as a background screen for the one or more message indicators in the voice intercom area; and
         (2) a text dialogue area below the voice intercom area;
      in accordance with detecting, by the mobile device, a first touch action located within the audio recording sub-area of the voice intercom area but not upon any of the message indicators and outside the text dialogue area:
         activating, by the mobile device, a first voice intercom function of the instant messaging application software by recording audio data captured by the mobile device; and
      in accordance with detecting, by the mobile device, a second touch action located on a first message indicator within the conversation sub-area:
         activating, by the mobile device, a second voice intercom function of the instant messaging application software by broadcasting an audio message stored in the memory and corresponding to the first message indicator within the conversation sub-area.

2. The method of claim 1, wherein the touch action comprises at least one of the following: touching the touch screen consecutively twice and continuing to press after the second touch, and pressing the touch screen continuously with a duration exceeding a preset threshold.

3. The method of claim 1, further comprising the following step after activating the first voice intercom function of the instant messaging application software:
   detecting a release of the first touch action from the touch screen;
   determining whether the amount of the recorded audio data is greater than a preset threshold in accordance with the detection of the release; and
   transmitting the audio data in accordance with a determination that the amount of the recorded audio data is greater than the preset threshold.

4. The method of claim 1, further comprising the following step after activating the first voice intercom function of the instant messaging application software:
   detecting a swipe of the first touch action on the touch screen; and
   ceasing recording the audio data and deleting the recorded audio data in accordance with a detection that the displacement between a beginning touch point of the swipe and an ending touch point of the swipe exceeds a preset threshold.

5. The method of claim 1, further comprising the following step:
   broadcasting the audio data if unread audio data used for voice intercom function is locally stored on the mobile device.

6. A mobile device for activating voice intercom function of instant messaging application software, comprising:
   a touch screen that detects a touch action; and
   a non-transitory storage medium connected with a processor;
   wherein the non-transitory storage medium stores one or more program modules configured for execution by the processor, the one or more program modules including instructions for:
      displaying, by the mobile device, a user interface of the instant messaging application software on the touch screen, the user interface including:
         (1) a voice intercom area including:
            (a) a conversation sub-area including one or more message indicators representing messages exchanged between users using the instant messaging application software; and
            (b) an audio recording sub-area within the voice intercom area that is not occupied by any of the message indicators and visually distinct from the message indicators, wherein the audio recording sub-area acts as a background screen for the one or more message indicators in the voice intercom area; and (2) a text dialogue area below the voice intercom area;

in accordance with detecting, by the mobile device, a first touch action located within the audio recording sub-area of the voice intercom area but not upon any of the message indicators and outside the text dialogue area:

activating, by the mobile device, a first voice intercom function of the instant messaging application software by recording audio data captured by the mobile device; and in accordance with detecting, by the mobile device, a second touch action located on a first message indicator within the conversation sub-area:

activating, by the mobile device, a second voice intercom function of the instant messaging application software by broadcasting an audio message stored in the memory and corresponding to the first message indicator within the conversation sub-area.

7. The mobile device of claim 6, wherein the touch action is: touching the touch screen consecutively twice and continuing to press after the second touch, or pressing the touch screen continuously with the duration exceeding a preset threshold.

8. The mobile device of claim 6, wherein the one or more program modules further include instructions for:

detecting a release of the first touch action from the touch screen;

determining whether the amount of the recorded audio data is greater than a preset threshold in accordance with the detection of the release; and transmitting the audio data in accordance with a determination that the amount of the recorded audio data is greater than the preset threshold.

9. The mobile device of claim 6, wherein the one or more program modules further include instructions for:

detecting a swipe of the first touch action on the touch screen; and ceasing recording the audio data and deleting the recorded audio data in accordance with a detection that the displacement between a beginning touch point of the swipe and an ending touch point of the swipe exceeds a preset threshold.

10. The mobile device of claim 6, wherein the one or more program modules further include instructions for:

broadcasting the audio data if unread audio data used for voice intercom function is stored in the mobile device.

11. A non-transitory computer readable storage medium having stored therein one or more instructions, which, when executed by a mobile device having a touch screen, cause the mobile device to:

display, by the mobile device, a user interface of the instant messaging application software on the touch screen, the user interface including:

(1) a voice intercom area including:

(a) a conversation sub-area including one or more message indicators representing messages exchanged between users using the instant messaging application software; and (b) an audio recording sub-area within the voice intercom area that is not occupied by any of the message indicators and visually distinct from the message indicators, wherein the audio recording sub-area acts as a background screen for the one or more message indicators in the voice intercom area; and (2) a text dialogue area below the voice intercom area;

in accordance with detecting, by the mobile device, a first touch action located within the audio recording sub-area of the voice intercom area but not upon any of the message indicators and outside the text dialogue area:

activate, by the mobile device, a first voice intercom function of the instant messaging application software by recording audio data captured by the mobile device; and in accordance with detecting, by the mobile device, a second touch action located on a first message indicator within the conversation sub-area:

activate, by the mobile device, a second voice intercom function of the instant messaging application software by broadcasting an audio message stored in the memory and corresponding to the first message indicator within the conversation sub-area.

12. The non-transitory computer readable storage medium of claim 11, wherein the touch action comprises at least one of the following: touching the touch screen consecutively twice and continuing to press after the second touch, and pressing the touch screen continuously with a duration exceeding a preset threshold.

13. The non-transitory computer readable storage medium of claim 11, wherein the instructions further cause the mobile device to:

detect a release of the first touch action from the touch screen;

determine whether the amount of the recorded audio data in accordance with the detection of the release; and transmit the audio data in accordance with a determination that the amount of the recorded audio data is greater than the preset threshold.

14. The non-transitory computer readable storage medium of claim 11, wherein the instructions further cause the mobile device to:

detect a swipe of the first touch action on the touch screen; and cease recording the audio data and delete the recorded audio data in accordance with a detection that the displacement between a beginning touch point of the swipe and an ending touch point of the swipe exceeds a preset threshold.

* * * * *